United States Patent

[11] 3,600,566

| | | | | |
|---|---|---|---|---|
| [72] | Inventors | Jesse R. Conner<br>Pittsburgh;<br>Kenneth E. Ball, Bridgeville, both of, Pa. | | |
| [21] | Appl. No. | 21,371 | | |
| [22] | Filed | Mar. 20, 1970 | | |
| [45] | Patented | Aug. 17, 1971 | | |
| [73] | Assignee | Environmental Science Inc.<br>Pittsburgh, Pa. | | |

[54] METHOD FOR INTEGRATING ELECTRICAL SIGNALS OVER LONG TIME PERIODS
7 Claims, 2 Drawing Figs.

[52] U.S. Cl. .................................................. 235/183,
250/219, 250/83.3 R, 73/3, 346/107, 324/61 R
[51] Int. Cl. ...................................................... G06f 7/56,
G06g 9/00
[50] Field of Search ........................................... 250/83.3 R,
715 S, 219 F; 179/100.3 F; 324/96, 61 R; 346/107;
356/158; 73/194, 206; 235/194

[56] References Cited
UNITED STATES PATENTS

| 3,275,826 | 9/1966 | Leiter .......................... | 250/71.5 S |
|---|---|---|---|
| 3,320,418 | 5/1967 | Steel ............................ | 250/71.5 S |

Primary Examiner—Eugene G. Botz
Attorney—Brown, Murray, Flick & Peckham

ABSTRACT: Method for integrating an electrical signal over long time periods and for storing the integral chemically. This is accomplished by converting the output signal of a transducer into a constant intensity light pulse whose frequency is proportional to the magnitude of the signal (digital techniques) or by applying the output of the transducer to an incandescent lamp or the like (analog techniques). The emitted light is directed onto photographic film which characteristically has a logarithmic response to the incident light, thereby accommodating a wide range of accumulated light pulses, or considering the total system, integrating analog signals over a long time period.

PATENTED AUG 17 1971 3,600,566

INVENTORS.
JESSE R. CONNER &
KENNETH P. BALL
By
Brown, Murray, Flick and Peckham
Attorneys

METHOD FOR INTEGRATING ELECTRICAL SIGNALS OVER LONG TIME PERIODS

CROSS-REFERENCE TO RELATED APPLICATIONS

Copending application Ser. No. 21,343, filed concurrently herewith and assigned to the Assignee of the present application.

BACKGROUND OF THE INVENTION

In most instrumentation applications for process control or the like, a transducer provides an electrical signal that is directly related to an instantaneous value to the variable being measured. For example, flow meters measure flow rate; thermocouples, thermistors and resistance bulbs measure the temperature attained by the sensor at that instant; analytical instruments monitoring process streams or the atmosphere measure an instantaneous value of a material of interest; sound level or noise survey meters measure an almost instantaneous value of certain sound intensities; and so on.

Often, it is desirable to have a time integral of these instantaneous values for a more usable data form. For example, accumulated flow is often just as important or perhaps more important then instantaneous flow rate; ear damage is a direct function of the time integral of sound intensity; and watthour meters are time integrating devices for electrical currents.

In many other cases, an instantaneous value of the signal is relatively unimportant and what is really desired is an average or mean value of a signal over a finite time. Such values can be further related timewise or with another parameter to show trends or definite functional interactions. This is particularly true with variables routinely values do not change rapidly with time. Examples are measurements of water temperature current rate, salinity, turbidity and dissolved oxygen in rivers, lakes and oceans. A time integrated signal for these variables which would supply a mean value, over an hour or several hours, can well be related to such slowly varying parameters as diurnal effects, tide motions, local rainfall and the like.

Serious limitations exist in device currently in use for electronic signal integration. These limitations include cost, power consumption, and in some cases size, weight and range of operation. It is very simple and straightforward to integrate an electrical signal by use of a capacitor over a period of a few seconds. In fact, this done routinely in operational amplifiers and analog computers. However, when the integration time exceeds a few seconds, the capacitor size becomes limiting and current leakage paths through and around the capacitor result in an integrated signal which becomes more and more unreliable as the integrating time increases toward minutes.

As will be appreciated, a recorded instantaneous signal, say on a strip chart, magnetic tape or even an X—Y plotter (where one coordinate is time) can be used for integrating these signals. However, the strip chart or X—Y recorders are relatively large and expensive. Usually, motor drives are involved which require relatively high power consumption. More over, tape and chart recorders usually do not include direct integrating capability. Therefore, a secondary operation is required if a time integral is desired.

The most commonly used integrating device is probably the electronic counter. This is basically a digital device and usually consists of a series of solid-state ring counters interconnected in a shift register arrangement. Readout is usually by a tube-type decimal display; and these require a considerable amount of power, especially when a separate display tube is needed for every significant figure. Analog-to-digital converter circuitry is, of course, required when digital counters are applied as analog signal integrators.

If the count frequency is not too rapid and if sufficient power is available, the pulse can be amplified sufficiently to drive an electromechanical counter for integrating purposes. The use of electromechanical counters, however, poses the problem of moving parts which can be a source of difficulty with long term unattended and/or remote temperature applications.

There exists electrochemical methods which can be used to integrate signals. One is a miniature storage battery arrangement wherein the amplified signal is used to charge a storage cell so that the cell electromotive force is a function of the accumulated signal. A second method is automated coulometric, amperometric or colorimetric titration cells wherein certain ion concentrations can be monitored or the amount of reagent materials necessary to maintain a certain cell characteristic can be cumulatively added as an integral signal. Both of these methods have disadvantages in the form of reversible reactions, poor stability, and difficulty in following rapidly changing signals.

SUMMARY OF THE INVENTION

In accordance with the present invention, an electrical signal to be integrated is converted into a radiant energy signal which is then directed onto a photochemically reactive substance, the arrangement being such that the material will generate a color, density, stain or the like proportional to the integral of the intensity of the radiant energy over a period of time.

In one embodiment of the invention shown herein, the electrical signal is converted into pulses of constant amplitude and width and used to fire a constant intensity light sources directed onto the photochemically reactive substance, the frequency of the pulses being proportional to the magnitude of the electrical signal being integrated. Alternatively, the electrical signal, in analog form, can be fed to an incandescent lamp or the like to provide a continuous light source with varying intensity directed onto the photochemically reactive material.

The photochemically reactive material is of the type shown and described in copending application Ser. No. 21,343, filed concurrently herewith. Preferably, it is a photographic negative, but may alternatively comprise a system based on light-sensitive metallic salts, bichromated colloids, or organic dyes sensitive to light. In the case of a photographic negative, the degree of exposure will determine the amount of silver deposited. Accordingly, the negative, after developing, can be used as a dielectric material between the plates of a capacitor whereby the degree of exposure and the amount of silver deposited will proportionally affect the capacitance of the capacitor. A suitably designed electronic circuit can then readout a value proportional to the integrated signal based on the capacitance of the parallel plate capacitor.

The above and other objects and features of the invention will become apparent from the following detailed description taken in connection with the accompanying drawings which form a part of this specification, and in which.

Figure 1:
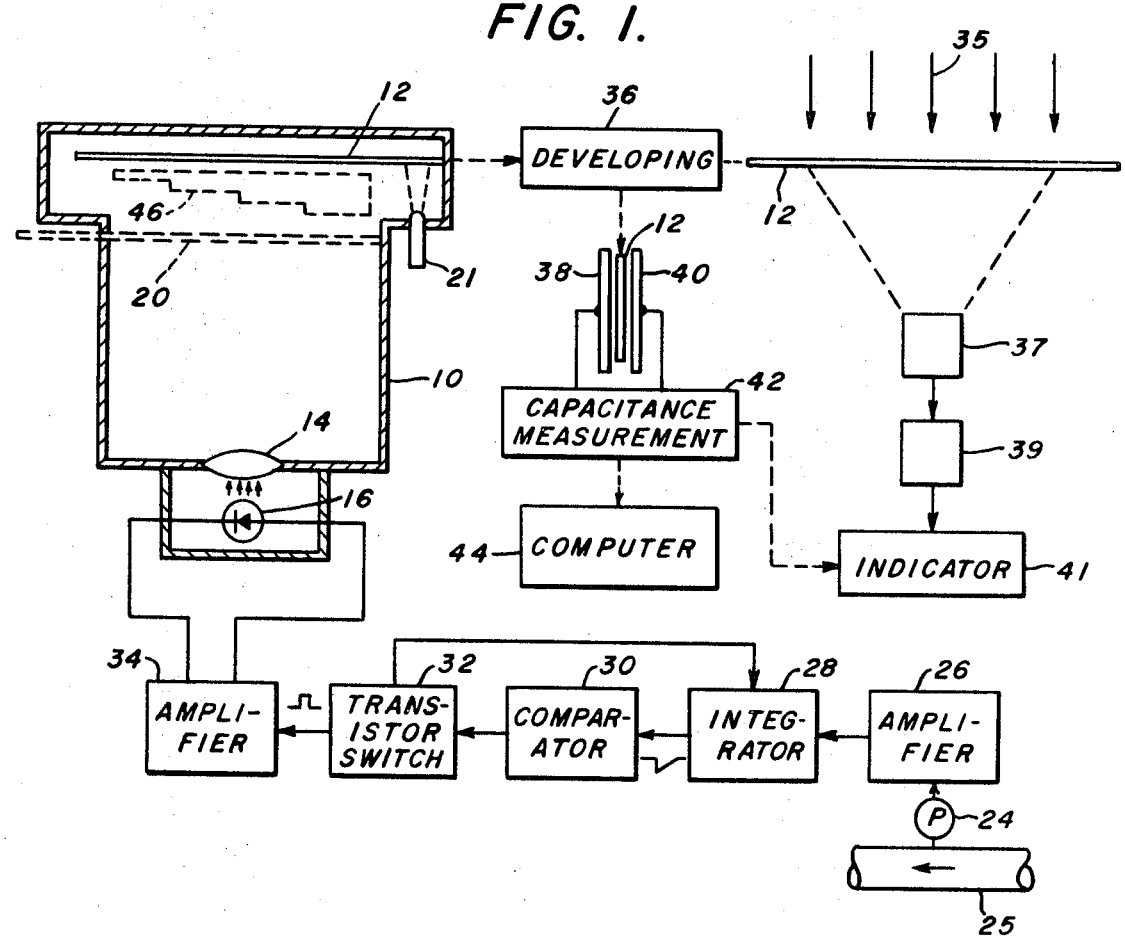
FIG. 1 is a schematic diagram of one embodiment of the invention.

With reference now to the drawings, and particularly to FIG. 1, the system shown includes a light-tight housing 10 within which a photographic film 12 is positioned with suitable positioning means, not shown. At the end of the light-tight housing 10 opposite the film 12 is an optical system which may include a lens 14 through which light from a light emitting diode 16, for example, passes. Incident radiant energy from the diode 16 passes through the lens 14 and is directed onto the film 12. A dark slide 20 may be positioned between the film 12 and the lens 14, but will be removed from between the two during an integration operation. Directed onto the one edge of the film 12 is a beam of light from a light source 21 of known intensity. This light source is used for purposes of calibration as will hereinafter be explained.

The system of FIG. 1 includes a transducer 24 which in the example shown, converts the pressure, within conduit 25 into a proportional electrical signal. As will be understood, however, the variable being monitored may be density, velocity, flow rate or any other variable. This electrical signal is amplified in amplifier 26 and applied to an electrical integrator 28. The output of the integrator 28 is a negative-going ramp with a time slope proportional to the direct current input signal from amplifier 26. At a predetermined negative level of the output of the integrator 28, a comparator 30 which may be a conventional Schmitt trigger circuit, fires a transistor switch 32 which resets the integrator 28 whereby the integration process is again initiated. The transistor switch 32 also produces a pulse which is amplified in amplifier 34, such that the amplitude and width of the pulse is constant. This pulse is then applied to the light emitting diode which produces a light pulse of fixed intensity and time duration. As the pressure within conduit 25 increases, the slope of the ramp output of integrator 28 will increase and the transistor switch 32 will be fired at a higher repetition rate. Consequently, the frequency of the light pulses of constant duration and intensity from the light emitting diode 16 will also increase. Moreover, the amount of radiation directed onto the film 12 over a given period of time increases such that when the film 12 is developed as at 36, the density of the resulting negative will also increase.

The density of the negative and, hence, the total integration may be determined by shining a light beam 35 of known intensity through the film 12 and passing the beam through an optical system 37 onto a standard densitometer 39 which applies an electrical signal to an indicator 41 proportional to density. The indicator 41, therefore, will give an indication of density and hence, total integration. Alternatively, if the photographic emulsion is on an opaque backing as it will be, for example, in the case of instant Polaroid photography, reflection techniques can be used to determine intensity.

However, it is also within the purview of the invention to take a developed negative 12 having a silver halide converted to metallic silver in the development process and insert it between capacitor plates 38 and 40 as shown in FIG. 1. These capacitor plates, in turn, are connected to a circuit 42 which measures capacitance. Since the amount of silver deposited on the negative is a function of the integral of the intensity of the light directed onto the negative over a predetermined period of time, the capacitance measured by the circuit 42 will also be proportional to this integral. The output of circuit 42 is an electrical signal indicative of density and, hence, the integrated parameter. This signal may be applied to the indicator 41 or to a computer 44 which performs an automatic calculation as will hereinafter be explained.

As is explained in copending application Ser. No. 21,343 filed concurrently herewith and assigned to the Assignee of the present application, photochemically reactive materials may be used instead of the photographic negative or instant Polaroid material. These include ferric salts in the presence of organic acids, the bichromate process, light-sensitive metallic salt processes, and organic dyes. Most of these, however, cannot be used with the capacitor plate arrangement shown.

Should input impedances greater than megohms be necessary, a field effect transistor preamplifier could easily be incorporated into the circuitry, making the device an electrometer-type signal integrator.

Representative of the performance of the systems of the invention, a voltage signal V is proportional to the emitted light pulse frequency $f$, or $V = K_1 f$, where $K_1$ is a constant depending upon the parameters of the system. $K_1$ can be adjusted such that the frequency of pulses associated with the highest anticipated signal will still allow discrete, separate pulses with no turn-on or turnoff overlap.

The film level of photochemical reaction, L, is proportional to the logarithm of the accumulated incident light so that:

$$L = K_2 \ln K^1 \int_{t=0}^{t} d(nt)$$

or $$L = K_2 \ln 1/K_1 \int_0^t d(vt)$$

where $n$ represents a pulse rate function of time and $t$ is time. The constants can be collected into one factor, $K^1$ and the integrated relationship becomes:

$$L = K^1 \ln (vt)$$

Figure 2:
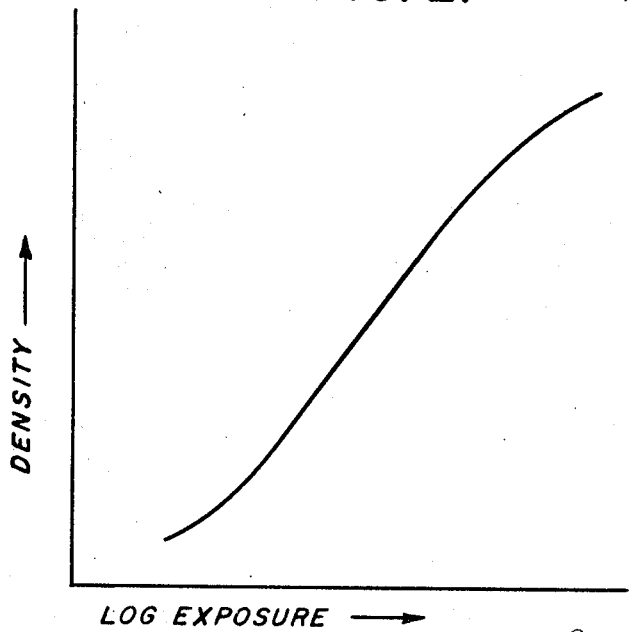
FIG. 2 is a characteristic photographic curve showing the relationship of exposure time to density produced on a photochemically reactive material.

Photographic film has a characteristic response such as that shown in FIG. 2. As indicated, the film response to light can be resolved linearly over a range of roughly 3 orders of magnitude. A step wedge 46 which is a commercially available graduated light filter can be inserted into the optical system between the light emitting diode 16 and the film 12 to increase the range by another 2 orders to magnitude or so.

As will be understood, an electronic readout such as that shown in FIG. 1 wherein a photographic negative is disposed between capacitor plates 38 and 40 has applications in relatively inexpensive, unsophisticated telemetry systems. Many telemetry systems now being used for data gathering in pipe line networks and pollution level monitoring systems, utilize a central computer which integrates the rate sensors fairly often (every minute or less) and then stores the integrated signal in a computer memory after performing the integration by an arithmetic program. If a computer is available and is a necessary part of a complex system, the added load by frequent interrogation of an array of sensors and the subsequent programming and data storage does not add significantly to the computer's operational load. However, with an integrating device as proposed at the sensor, much simpler data acquisition systems can be devised. A telephone line or other communications link interrogation can then be made hourly, daily or even monthly and the received signal simply punched out on a paper tape which has the time and date code. An advantage of significance in such a system is that the integrated signal is still permanently recorded and can be visually or optically read.

Although the invention has been shown in connection with certain specific embodiments, it will be readily apparent to those skilled in the art that various changes in form and arrangement of parts may be made to suit requirements without departing from the spirit and scope of the invention. In this respect, it will be apparent that instead of converting an electrical signal into light energy, it may be converted into other forms of radiant energy such as X-rays or microwaves and these directed onto a photochemically reactive substance whose density will vary as a function of the integral of the applied radiant energy.

We claim as our invention:

1. In the method for integrating an electrical signal, the steps of converting said electrical signal into radiant energy the intensity and duration of which are a function of the magnitude and duration of said electrical signal, exposing a photochemically reactive substance to the radiant energy thus produced whereby the optical density of said photochemically reactive material will be a function of the integral of the intensity of said radiant energy over said duration, and determining the density of said photochemically reactive material after exposure to said radiant energy.

2. The method of claim 1 wherein said photochemically reactive substance comprises a photographic emulsion deposited on a film, and including the steps of developing said film to convert a metal halide to a metal, positioning said developed film between capacitor plates, and establishing a potential between said capacitor plates, and measuring the capacitance of the capacitor formed by said plates and the film therebetween to determine the optical density of said photographic emulsion and hence the integral of said electrical signal.

3. The method of claim 1 wherein said radiant energy comprises light.

4. The method of claim 1 including the step of applying said electrical signal as an analog signal to a light-producing device which will emit light of intensity proportional to the magnitude of said electrical signal.

5. The method of claim 1 wherein the density of said photochemically reactive material is determined by exposing the material after exposure to said radiant energy to light whose intensity will be altered by the density of the photochemically reactive material and measuring the intensity of said light after exposure to said photochemically reactive material.

6. The method of claim 1 including the step of converting said electrical signal into pulses of fixed width and amplitude, and firing a light emitting diode by said pulses to produce said radiant energy.

7. The method of claim 6 wherein said electrical signal is converted into pulses by initially integrating said electrical signal in an integrator, comparing the magnitude of the integrated signal with a predetermined magnitude to produce a pulse each time said predetermined magnitude is reached, and resetting said integrator to again begin integrating from its original starting point each time a pulse is produced.